US008253387B2

(12) United States Patent
Newhouse et al.

(10) Patent No.: US 8,253,387 B2
(45) Date of Patent: Aug. 28, 2012

(54) BATTERY CHARGING CONTROL METHODS AND APPARATUS

(75) Inventors: Vernon L. Newhouse, Farmington, MI (US); Richard A. Marsh, Beverly Hills, MI (US); Carol L. Johnson, Rochester Hills, MI (US); Paul G. Groshek, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 463 days.

(21) Appl. No.: 12/429,946

(22) Filed: Apr. 24, 2009

(65) Prior Publication Data

US 2010/0270980 A1 Oct. 28, 2010

(51) Int. Cl.
*H02J 7/04* (2006.01)
*H02J 7/16* (2006.01)

(52) U.S. Cl. ......... 320/150; 320/104; 320/153; 320/144

(58) Field of Classification Search .................. 320/104, 320/150, 153, 144
See application file for complete search history.

(56) References Cited

U.S. PATENT DOCUMENTS

| | | | | |
|---|---|---|---|---|
| 5,187,425 A | * | 2/1993 | Tanikawa | 320/138 |
| 5,703,468 A | * | 12/1997 | Petrillo | 320/101 |
| 6,111,389 A | * | 8/2000 | Aranovich et al. | 320/150 |
| 6,232,743 B1 | * | 5/2001 | Nakanishi | 320/104 |
| 2002/0060554 A1 | * | 5/2002 | Odaohhara et al. | 320/134 |
| 2002/0097026 A1 | * | 7/2002 | Kernahan et al. | 322/28 |
| 2002/0113576 A1 | * | 8/2002 | Oomura et al. | 320/134 |
| 2003/0015993 A1 | * | 1/2003 | Misra et al. | 320/125 |
| 2005/0137823 A1 | * | 6/2005 | Becker-Irvin et al. | 702/130 |

* cited by examiner

*Primary Examiner* — Samuel Berhanu
(74) *Attorney, Agent, or Firm* — Ingrassia Fisher & Lorenz P.C.

(57) ABSTRACT

Embodiments include methods for charging a battery of an electrical system. The electrical system includes the battery, a battery charger, and a controller. The battery charger is adapted to produce an output power in response to a control signal from the controller. The controller is adapted to control a battery charging process by determining a temperature of the battery pack, determining a voltage setpoint for the battery charger based on the temperature, and providing the control signal to the battery charger. According to an embodiment, when the temperature of the battery exceeds a first temperature value, the battery charging process is temporarily suspended prior to satisfying a charging termination criterion. Determining the temperature of the battery is repeated, and when the temperature of the battery is less than a second temperature value, the battery charging process is resumed.

15 Claims, 3 Drawing Sheets

BATTERY CHARGING CONTROL METHODS AND APPARATUS

TECHNICAL FIELD

Embodiments relate to battery charging control methods and apparatus, and more particularly to battery charging control methods and apparatus that include a temperature-based charging suspension process.

BACKGROUND

A high voltage battery pack (e.g., for use in an electric vehicle) is a consumable good, which has useable energy capacity that becomes depleted over time in response to environmental conditions and the high voltage State of Charge (SOC) of the battery. SOC represents the amount of useable energy in a high voltage battery pack, and is typically represented by a range of 0% to 100%. The degradation rate of a high voltage battery pack's capacity is increased while the battery pack remains at high SOC values and high temperatures for extended periods of time.

A conventional plug-in electric vehicle (e.g., a fully electric or hybrid electric vehicle) uses an on-board or off-board battery charger to charge the vehicle's battery pack from a utility alternating current (AC) outlet. When the vehicle is not being driven (e.g., when the vehicle is parked at home for the night), the vehicle's operator may connect the vehicle to an outlet via the battery charger. The battery charger will consume energy from the utility in order to recharge the battery pack. The recharging process terminates once the battery pack has received sufficient energy from the battery charger to raise the SOC of the battery pack to a maximum level.

Using conventional recharging methods, currents supplied to the battery pack may be significant (e.g., 10 to 30 amps or higher). These currents may cause the temperature of the battery pack to become very high. In addition, the vehicle may be exposed to ambient conditions that may lead to the battery pack having a high standing temperature. The longer that the battery pack remains at high temperatures and high SOC values, the more that the useable life of the battery pack is decreased. Once the energy storage capacity of the battery pack becomes too low, the battery pack must be replaced. Replacement battery packs are relatively expensive components, and accordingly their occasional replacement may significantly increase the operational expense of owning and operating an electric vehicle.

In order to decrease the operational expenses associated with owning and operating electric vehicles (and thus to increase the incentives for consumers to purchase and use plug-in electric vehicles), it is desirable to provide methods and apparatus for recharging battery packs that may result in longer useable lives of the battery packs, when compared with the useable lives of battery packs that are recharged using conventional recharging methods and apparatus. Other desirable features and characteristics will become apparent from the subsequent detailed description and the appended claims, taken in conjunction with the accompanying drawings and the foregoing technical field and background.

SUMMARY

An embodiment includes method for charging a battery of an electrical system. The electrical system includes the battery, a battery charger, and a controller, and the method includes the steps of determining a temperature of the battery, determining, based on the temperature, a voltage setpoint for the battery charger, and controlling the battery charger to produce an output power that results in increasing an output voltage of the battery toward the voltage setpoint.

Another embodiment includes a method for charging a battery of an electrical system, which includes the steps of initiating a charging process to charge the battery, and determining a temperature of the battery. When the temperature of the battery exceeds a first temperature value, the method includes temporarily suspending the battery charging process prior to satisfying a charging termination criterion. Determining the temperature of the battery is repeated, and when the temperature of the battery is less than a second temperature value, the battery charging process is resumed.

Another embodiment includes an electrical system that includes a high voltage (HV) energy storage system, a battery charger, and a controller. The HV energy storage system has a battery pack that is adapted to store electrical energy. The battery charger is adapted to produce an output voltage in response to a control signal that indicates a voltage setpoint for the output voltage. The controller is adapted to control a battery charging process by determining a temperature of the battery pack, determining a voltage setpoint for the battery charger based on the temperature, and providing the control signal to the battery charger.

BRIEF DESCRIPTION OF THE DRAWINGS

Embodiments of the inventive subject matter will hereinafter be described in conjunction with the following drawing figures, wherein like numerals denote like elements.

DETAILED DESCRIPTION

The following detailed description is merely exemplary in nature and is not intended to limit the scope or the application and uses of the inventive subject matter. Furthermore, there is no intention to be bound by any expressed or implied theory presented in the preceding technical field, background, summary or the following detailed description. In the following description, like reference numbers relate to like elements in each of the Figures.

Embodiments include battery charging control methods and apparatus. More particularly, embodiments include battery charging control methods and apparatus that include a temperature-based charging suspension process. As will be described in more detail below, embodiments may be integrally included in an electric vehicle, and more particularly into a plug-in type of electric vehicle. As used herein, the term "electric vehicle" includes both fully electric (e.g., electric only) motor vehicles and hybrid electric motor vehicles. According to various embodiments, the term "plug-in," as applied to a vehicle, means a vehicle having at least a direct current (DC) energy source (e.g., one or more high voltage battery packs) and a hardware interface that is adapted to connect with a utility alternating current (AC) outlet in order to charge the DC energy source using power supplied by the electric utility. Although the below-described embodiments may refer to their incorporation into a plug-in, electric vehicle, it is to be understood that such references are not intended to limit the scope of the embodiments to incorporation only into plug-in, electric vehicles. Instead, it is to be understood, that embodiments also may be incorporated into other types of vehicles (e.g., aircraft, watercraft, locomotives) or into electrical systems that are not associated with electric vehicles.

The following description refers to system components, elements, nodes or features being "coupled" together. As used herein, unless expressly stated otherwise, the term "coupled" means that one component/element/node/feature is directly or indirectly joined to (or directly or indirectly communicates with) another component/element/node/feature, and not necessarily mechanically. Thus, although the Figures described below may depict various exemplary arrangements of components/elements/nodes/features, additional intervening components, elements, nodes, features or devices may be present in other embodiments of the depicted subject matter.

Figure 1:
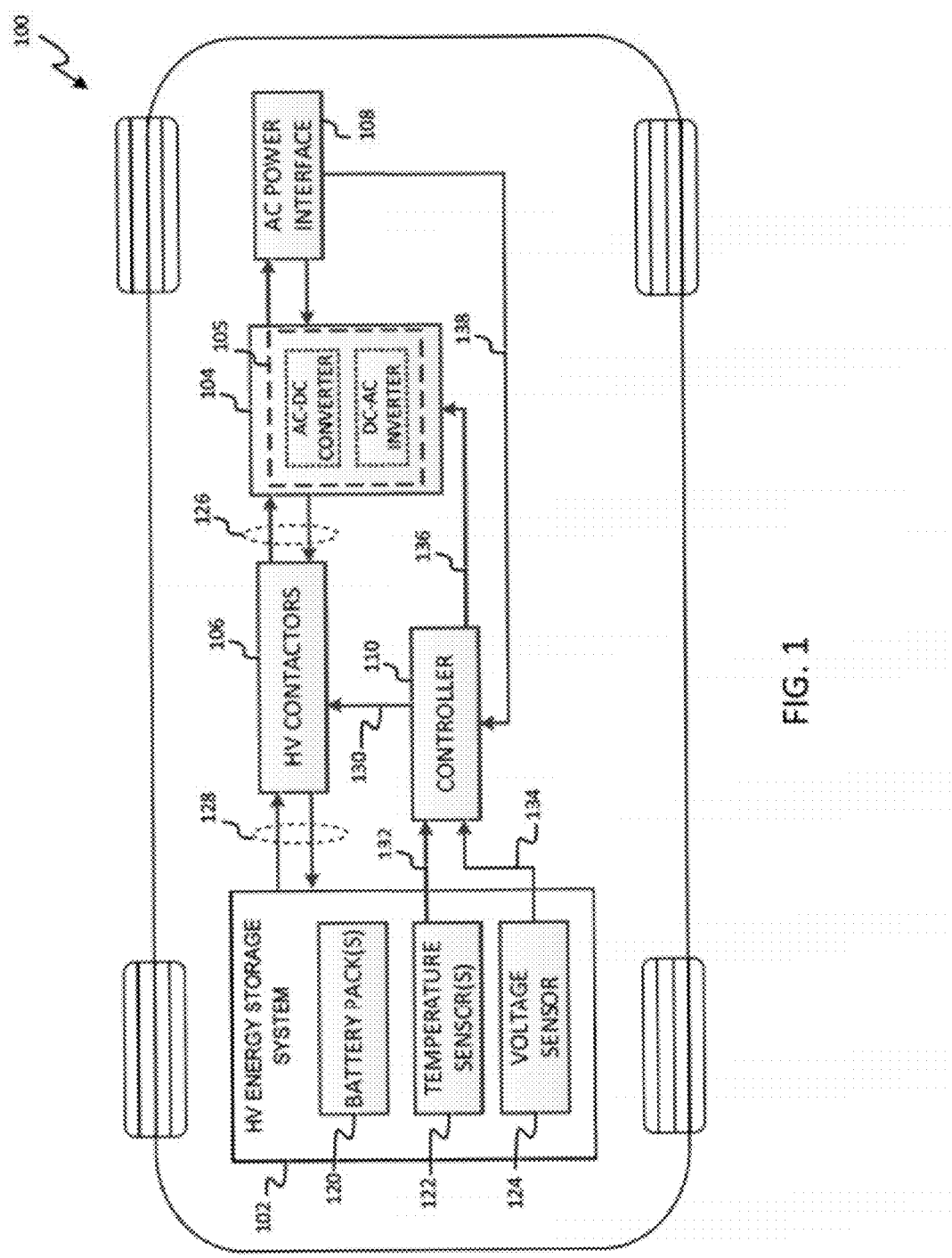
FIG. 1 is a schematic representation of a plug-in electric vehicle that includes a high voltage energy storage system, in accordance with an example embodiment.

FIG. 1 is a schematic representation of a plug-in electric vehicle 100, which includes a high voltage (HV) energy storage system 102, in accordance with an example embodiment. Vehicle 100 may be any one of a number of different types of automobiles, such as, for example, a sedan, a wagon, a truck, or a sport utility vehicle, and may be two-wheel drive (i.e., rear-wheel drive or front-wheel drive), four-wheel drive, or all-wheel drive. Vehicle 100 may also incorporate any one of, or combination of, a number of different types of engines and/or traction systems, such as, for example, a gasoline or diesel fueled combustion engine, a "flex fuel vehicle" engine (i.e., using a mixture of gasoline and alcohol), a gaseous compound (e.g., hydrogen and natural gas) fueled engine, a combustion/electric motor hybrid engine, and an electric motor.

In addition to the HV energy storage system 102, vehicle 100 includes a battery charger 104, a set of HV contactors 106, an AC power interface 108, and a controller 110. In embodiments in which vehicle 100 is a hybrid electric vehicle, vehicle 100 also may include an engine (e.g., an internal combustion engine, not illustrated). Vehicle 100 also may include numerous other components and systems, which are not illustrated in FIG. 1 or described in detail herein for the purposes of brevity.

AC power interface 108 is in operable communication with and/or electrically coupled with battery charger 104. AC power interface 108 is a hardware interface that is adapted to couple with an electric utility or other external power source in order to receive AC power from the electric utility or other external power source. In an embodiment, AC power interface 108 includes a junction box that is adapted to receive an electrical plug, which may be electrically coupled with or connected to a utility AC outlet or another interface with an external power source (e.g., a household electrical outlet of a charging station). AC power interface 108 may include a two-conductor AC power interface, a three-conductor AC power interface, a single-phase junction box, a two-phase junction box, a three-phase junction box, a single-phase plug, a two-phase plug, and/or a three-phase plug. When the AC power interface 108 is electrically coupled with an external AC power source, the AC power interface 108 may provide the AC power to battery charger 104, which is electrically coupled to AC power interface 108. In addition, according to an embodiment, AC power interface 108 may provide a status signal 138 to controller 110, which indicates whether or not the AC power interface 108 is electrically coupled with an external AC power source.

Battery charger 104 may include, for example, an inverter system 105 that is adapted to function as an AC-to-DC converter. When controlled to function as an AC-to-DC converter, battery charger 104 is adapted to convert AC power received directly from AC power interface 108 (or received indirectly from one or more AC electric motors, not illustrated, which are connected to the AC power interface 108) into DC power. The DC power may be provided by battery charger 104 across the charger's positive and negative output terminals 126. According to various embodiments, battery charger 104 may provide constant current charging or pulse charging (e.g., providing a sequence of DC pulses). As will be described in more detail later, battery charger 104 may generate the charger output power at terminals 126 at a level that is specified by or indicated by a charger control signal 136 from controller 110. Although battery charger 104 is depicted in FIG. 1 as being coupled to an AC power interface 108, according to an alternate embodiment, battery charger 104 may be an isolated type of battery charger, which includes means (not illustrated) for inductively coupling with the AC power source, in addition to or in lieu of AC power interface 108.

HV contactors 106 are coupled between the battery charger 104 and the HV energy storage system 102. One or more busses and/or other transmission media or circuitry (not illustrated) may be included between the HV contactors 106, battery charger 104, and HV energy storage system 102. HV contactors 106 include a set of relays, which may be selectively opened and closed based on contactor control signals 130 provided by controller 110. When closed, HV contactors 106 may transfer electrical power between the battery charger 104 and the HV energy storage system 102. More specifically, once the HV contactors 106 are closed, a charger output voltage across the charger's positive and negative output terminals 126 is forced to be substantially the same voltage as the voltage across the HV battery pack 120, since the battery charger 104 and the HV battery pack 120 are coupled together. When it is desired to provide additional charge to the HV battery pack 120, the battery charger 104 is controlled to output power across its terminals 126 (e.g., "charge current"), and this additional output power causes the voltage of the HV battery pack 120 to increase.

According to an embodiment, HV energy storage system 102 is adapted to receive electrical energy from energy supplying components (e.g., battery charger 104), to store the energy, and to supply the energy at high voltage to other system components (not illustrated). As used herein, the terms "high-voltage" and "HV" mean a DC voltage provided by an energy storage system (e.g., HV energy storage system 102), where the DC voltage is a voltage in excess of about 60 volts.

According to an embodiment, the HV energy storage system 102 includes one or more HV battery packs 120, one or more temperature sensors 122, and a voltage sensor 124. HV energy storage system 102 also may include one or more cooling fans (not illustrated), which may be selectively activated to help to lower the temperature of the battery packs 120 during a recharging operation (or at other times). The battery packs 120, temperature sensors 122, and voltage sensor 124 are referred to singularly, below, although it is to be understood that the HV energy storage system 102 may include multiple ones of each of these components.

Battery pack 120, which may be referred to simply as "battery" herein, includes a set of one or more batteries, individual battery cells, super capacitors, and the like, which may be configured in series, parallel, or a mixture of both. Interconnects (not illustrated) provide electrical conductivity between the batteries and/or battery cells. According to an embodiment, battery pack 120 is a high voltage battery pack, which is adapted to produce a maximum output voltage across its terminals in a range of about 300 volts to about 350 volts. In other embodiments, battery pack 120 may produce a maximum output voltage in a range of about 60 volts to about 300 volts. In still other embodiments, battery pack 120 may be adapted to produce a maximum output voltage that is higher or lower than the above-given ranges.

Temperature sensor 122 is arranged in close physical proximity to battery pack 120, and is adapted to produce temperature signals 132 that indicate a sensed temperature of the battery pack 120. Voltage sensor 124 is electrically coupled across the terminals of battery pack 120, and is adapted to produce battery voltage signals 134 that indicate sensed voltages across the terminals. The temperature signals 132 and the battery voltage signals 134 are provided to controller 110, which may use the indicated temperatures and voltages to control the charging process, as will be described in more detail below.

Controller 110 is in operable communication with battery charger 104, HV contactors 106, temperature sensor 132, voltage sensor 134, and AC power interface 108, according to an embodiment. Although not shown in detail, controller 110 may include various sensors and automotive control modules, or electronic control units (ECUs) (e.g., an inverter control module and a vehicle controller), at least one processor, and/or a memory (or other computer-readable medium) which includes data and instructions stored thereon for carrying out the processes and methods as described below.

As mentioned previously, the level of the charger output power (and thus the charge current) provided by the battery charger 104 is controlled through charger control signals 136 generated by controller 110. As will be described in more detail in conjunction with FIG. 2, controller 110 is adapted to generate the charger control signals 136 based upon the state of the battery pack 120 (e.g., the battery pack voltage, temperature, and/or time under charge). According to an embodiment, controller 110 is adapted to receive temperature signals 132 and voltage signals 134, which indicate temperatures and voltages of the battery pack 120, respectively. Based on the temperature and voltage signals 132, 134, controller 110 may determine a desired charger output power (or charge current), and controller 110 may generate the control signals 136 in order to cause the battery charger 104 to produce the desired charger output power, as will be described in more detail below. Charging may be terminated when controller 110 determines that a combination of the battery pack voltage, temperature, and/or time under charge indicates that the battery pack 120 is fully charged (e.g., the battery pack 120 has a desired maximum State of Charge (SOC)).

Figure 2:
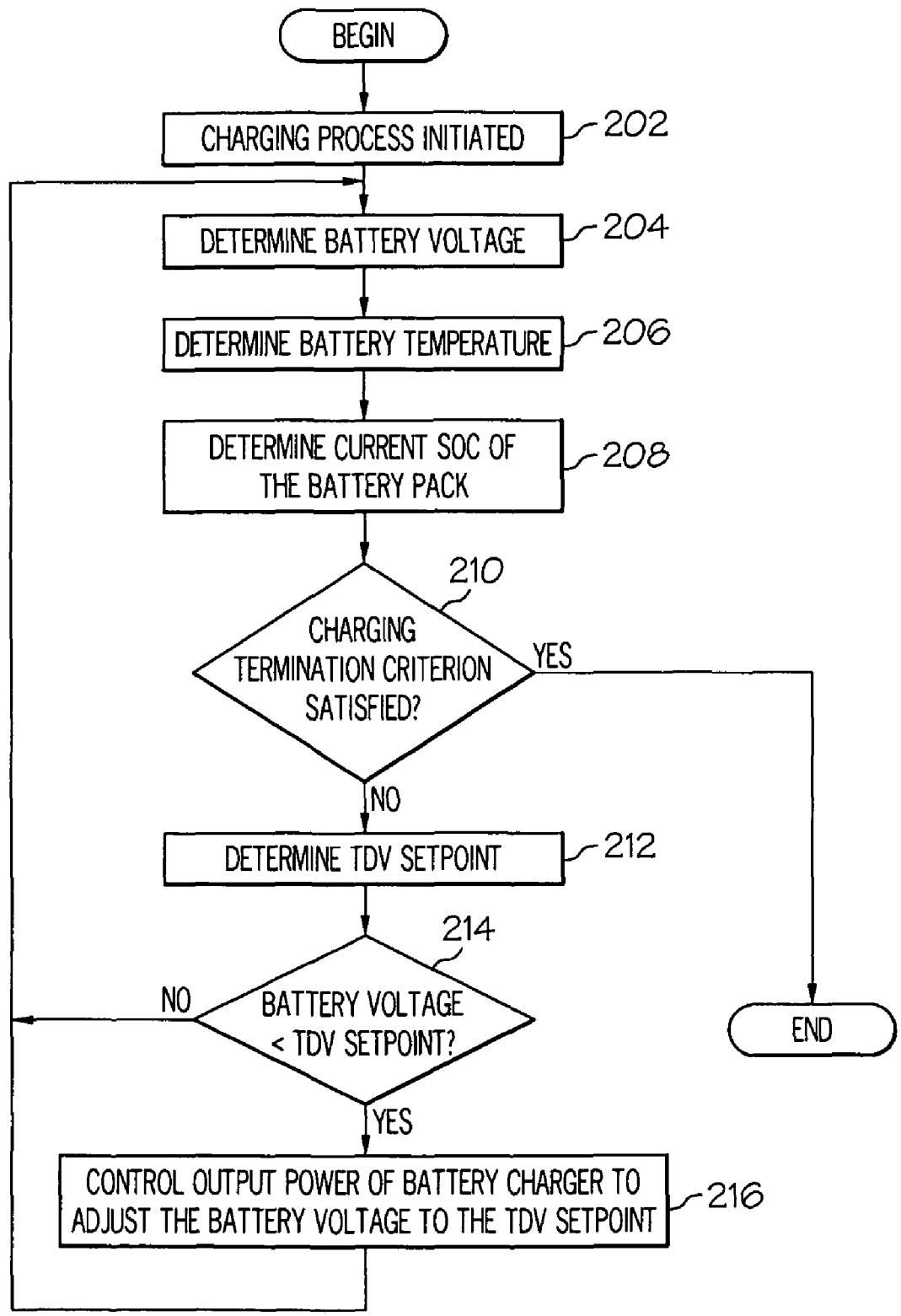
FIG. 2 is a flowchart of a battery charging control method that includes a temperature-based, charging suspension process, in accordance with an example embodiment.

FIG. 2 is a flowchart of a battery charging control method that includes a temperature-based, charging suspension process, in accordance with an example embodiment. Embodiments of the method depicted in FIG. 2 may be carried out by a controller (e.g., controller 110, FIG. 1) of an electric vehicle, which may fetch and execute instructions for carrying out the processes and methods as described herein. In alternate embodiments, the method may be carried out by a controller of another type of apparatus that includes a rechargeable energy source.

As will be described in more detail below, once a battery charging process is initiated, it may continue until a charge termination criteria has been satisfied (e.g., as determined in block 210, described later). For example, charge termination criteria may be that the battery pack has reached a maximum SOC. The maximum SOC may be 100% SOC or some other percentage that is less than 100% SOC (e.g., 95% SOC). As another example, a charge termination criteria may be that the battery voltage (i.e., across its high voltage and low voltage terminals) is at a maximum battery voltage (e.g., 350 volts, or some other voltage). According to an embodiment, the battery charging process may be temporarily suspended one or more times prior to the charge termination criteria being met, where a determination to suspend the charging process is made based on a temperature of the battery. The battery charging process, including the temperature-based, charging suspension process is described in more detail below.

The method may begin, in block 202, when a battery charging process has been initiated. According to an embodiment, the battery charging process may be initiated when the controller receives some indication that the system has been configured to receive AC power from an external source. For example, the controller may receive a status signal (e.g., status signal 138 from AC power interface 108), which indicates that the AC power interface has been electrically coupled with an external AC power source. In other embodiments, the controller may receive some other indication that the system has been configured to receive AC power.

In block 204, the current voltage across the terminals of the battery pack is determined. According to an embodiment, this may include the controller receiving voltage signals (e.g., voltage signals 134, FIG. 1) from a voltage sensor (e.g., voltage sensor 124, FIG. 1), and determining a battery pack voltage value from the voltage signals.

In block 206, the temperature of the battery pack is determined. According to an embodiment, this may include the controller receiving temperature signals (e.g., temperature signals 132, FIG. 1) from one or more temperature sensors (e.g., temperature sensors 122, FIG. 1), and determining a battery pack temperature value from the temperature signals. When a single temperature signal is used to convey a single temperature measurement to the controller, the battery pack temperature may be determined to be the temperature measurement. When multiple temperature signals are used and/or multiple temperature measurements are conveyed to the controller, the controller may calculate the battery pack temperature based on some mathematical criteria (e.g., average of multiple measurements, highest measurement, or some other criteria).

In block 208, the controller may determine the current SOC of the battery pack (e.g., battery pack 120, FIG. 1). The terminal voltage of the battery pack may stay relatively constant until the battery pack is almost fully discharged. Accordingly, the terminal voltage may not be an accurate indicator of the current SOC of the battery pack. According to an embodiment, the controller may calculate the current SOC of the battery pack based on the battery voltage (e.g., as determined in block 204), among other things. For example, the current SOC of the battery pack may be calculated using methods described in U.S. Pat. No. 6,639,385, entitled "State of Charge Method and Apparatus," using a look-up table, or using other methods, according to various embodiments.

In block 210, the controller may determine whether or not a charging termination criterion has been satisfied. A charging termination criteria may include one or more criteria selected from a group of criteria that includes a current SOC meeting or exceeding a maximum SOC threshold, and a battery pack voltage meeting or exceeding a maximum battery pack voltage threshold, for example but not by way of limitation.

For example, when the charging termination criteria is related to the battery pack's SOC, a maximum SOC threshold may be defined in the system as an SOC value in a range of about 85% SOC to about 100% SOC, although an SOC threshold may have a value that is lower than the above-given range, as well. In block 210, when a determination is made that the current SOC of the battery pack is above the maximum SOC threshold, the method ends. Otherwise, the method continues to block 212, which will be described in more detail below.

As another example, when the charging termination criteria is related to the battery pack's voltage, a maximum battery pack voltage threshold may be defined in the system as a voltage in a range of about 85% to about 100% of the voltage capacity of the battery pack (e.g., 350 volts), although a voltage threshold may have a value that is lower than the above-given range, as well. In block 210, when a determination is made that the battery pack voltage is above the maximum battery pack voltage threshold, the method ends. Otherwise, the method continues to block 212.

When the charging termination criteria has not been satisfied, then in block 212, a temperature-dependent voltage (TDV) setpoint is determined, and the output power of the battery charger (e.g., battery charger 104, FIG. 1) is adjusted, as will be described in more detail later in conjunction with block 216. According to a first embodiment, the TDV setpoint is determined based on the battery pack temperature. Using the battery pack temperature, the TDV setpoint may either be calculated, or may be determined from a table (e.g., Table 1, below) that is stored in memory that is accessible to the controller. For example, the TDV setpoint value may be determined based on a pre-defined mathematical relationship between the battery pack temperature (e.g., as determined in block 206) and the TDV setpoint. For example, but not by way of limitation, a mathematical relationship between battery pack temperature, T, and TDV setpoint, TDV, may be defined as:

for $T \leq T_L$, $TDV(T) = TDV_{MAX}$;

for $T_L < T < T_H$, $TDV(T) = TDV_{MAX} - mT$; and for $T \geq T_H$, $TDV(T) = TDV_{MIN}$, where m is a conversion constant, $T_L$ is a low battery pack temperature threshold (e.g., 0 degrees C.), $T_H$ is a high battery pack temperature threshold (e.g., 50 degrees C.), $TDV_{MAX}$ is a pre-defined maximum TDV setpoint (e.g., 350 volts, the maximum battery pack voltage, or some other value), and $TDV_{MIN}$ is a pre-defined, minimum TDV setpoint (e.g., 250 volts or some other value (including 0 volts)). Although the equation corresponding to the condition when $T_L < T < T_H$ is a linear equation and is dependent upon $TDV_{MAX}$, that equation may instead be an exponential or logarithmic equation (or some other type of equation), and/or may be dependent upon some constant other than $TDV_{MAX}$, in other embodiments. The above mathematical relationships are provided for purposes of explanation, and not by way of limitation.

According to another embodiment, the TDV setpoint may be determined by accessing a temperature/TDV setpoint table (e.g., Table 1, below), which includes a plurality of entries, and each entry includes a pair of pre-determined temperature/TDV setpoint values. An entry may be selected that corresponds to the battery pack temperture (e.g., as determined in block 206), and the TDV setpoint may be determined as the TDV setpoint value for that entry. Temperature values within the entries may fall within a range of typical battery pack temperatures (e.g., −40 degrees Celsius (C.) to 60 degrees C.), and the TDV setpoint values within the entries may fall within a range that extends from a low TDV setpoint value (e.g., $TDV_{MIN}$) to a high TDV setpoint value (e.g., $TDV_{MAX}$). Table 1 below is an example of a temperature/TDV setpoint table:

TABLE 1

Temperature/TDV Setpoint Table

| Entry number | Temperature range (degrees C.) | TDV setpoint (volts) |
|---|---|---|
| 1 | <−40 | 350 |
| 2 | −40 to −30 | 350 |
| 3 | −30 to −20 | 350 |
| 4 | −20 to −10 | 350 |
| 5 | −10 to 0 | 350 |
| 6 | 0 to 10 | 330 |
| 7 | 10 to 20 | 310 |
| 8 | 20 to 30 | 290 |
| 9 | 30 to 40 | 270 |
| 10 | 40 to 50 | 250 |
| 11 | 50 to 60 | 250 |
| 12 | >60 | 250 |

It is to be understood that other temperature/TDV setpoint tables may include more or fewer entries, the range of temperature values may be higher and/or lower, and/or the range of TDV setpoint values may be higher and/or lower than are included in the example Table 1.

In the example embodiment above, the TDV setpoint is determined based primarily on the battery pack temperature. According to another embodiment, an allowable SOC is first determined based on the battery pack temperature, and a TDV setpoint may be determined based on the allowable SOC. Using the battery pack temperature, the allowable SOC may either be calculated, or may be determined from a table (e.g., Table 2, below) that is stored in memory that is accessible to the controller. For example, the allowable SOC may be determined based on a pre-defined mathematical relationship between the battery pack temperature (e.g., as determined in block 206) and the allowable SOC. For example, but not by way of limitation, a mathematical relationship between battery pack temperature, T, and allowable SOC, $SOC_A$, may be defined as:

for $T < T_L$, $SOC_A(T) = SOC_{MAX}$;

for $T_L < T < T_H$, $SOC_A(T) = (SOC_{MAX})e^{-nT}$; and for $T \geq T_H$, $SOC_A(T) = SOC_{MIN}$, where n is a conversion constant, $T_L$ is a low battery pack temperature threshold (e.g., 0 degrees C.), $T_H$ is a high battery pack temperature threshold (e.g., 50 degrees C.), $SOC_{MAX}$ is a pre-defined maximum SOC (e.g., 95% or some other value (including 100%)), and $SOC_{MIN}$ is a pre-defined, minimum SOC (e.g., 50% or some other value). Although the equation corresponding to the condition when $T_L < T < T_H$ is a decaying exponential function with an initial quantity of $SOC_{MAX}$, that equation may instead be a linear equation, a logarithmic equation (or some other type of equation), and/or may have an initial quantity other than $SOC_{MAX}$, in other embodiments. The above mathematical relationships are provided for purposes of explanation, and not by way of limitation.

According to an embodiment, the TDV setpoint may be calculated based on the allowable SOC using a function similar to the function used to calculate the current SOC (e.g., in block 208). According to another embodiment, the TDV setpoint may be determined by accessing an $SOC_A$/TDV setpoint table (e.g., Table 2, below), which includes a plurality of entries, and each entry includes a pair of pre-determined $SOC_A$/TDV setpoint values. An entry may be selected that corresponds to the allowable SOC (e.g., as determined above), and the TDV setpoint may be determined as the TDV setpoint value for that entry. $SOC_A$ values within the entries may fall within a range (e.g., $SOC_{MIN}$ to $SOC_{MAX}$), and the TDV setpoint values within the entries may fall within a range that extends from a low TDV setpoint value (e.g., $TDV_{MIN}$) to a high TDV setpoint value (e.g., $TDV_{MAX}$). Table 1 below is an example of an $SOC_A$/TDV setpoint table:

TABLE 2

$SOC_A$/TDV Setpoint Table

| Entry number | $SOC_A$ range (%) | TDV setpoint (volts) |
| --- | --- | --- |
| 1 | 95 to 100 | 350 |
| 2 | 90 to 95 | 350 |
| 3 | 85 to 90 | 350 |
| 4 | 80 to 85 | 350 |
| 5 | 75 to 80 | 350 |
| 6 | 70 to 75 | 330 |
| 7 | 65 to 70 | 310 |
| 8 | 60 to 65 | 290 |
| 9 | 55 to 60 | 270 |
| 10 | 50 to 55 | 250 |
| 11 | >50 | 250 |

It is to be understood that other $SOC_A$/TDV setpoint tables may include more or fewer entries, the range of $SOC_A$ values may be higher and/or lower, and/or the range of TDV setpoint values may be higher and/or lower than are included in the example Table 2.

Figure 3:
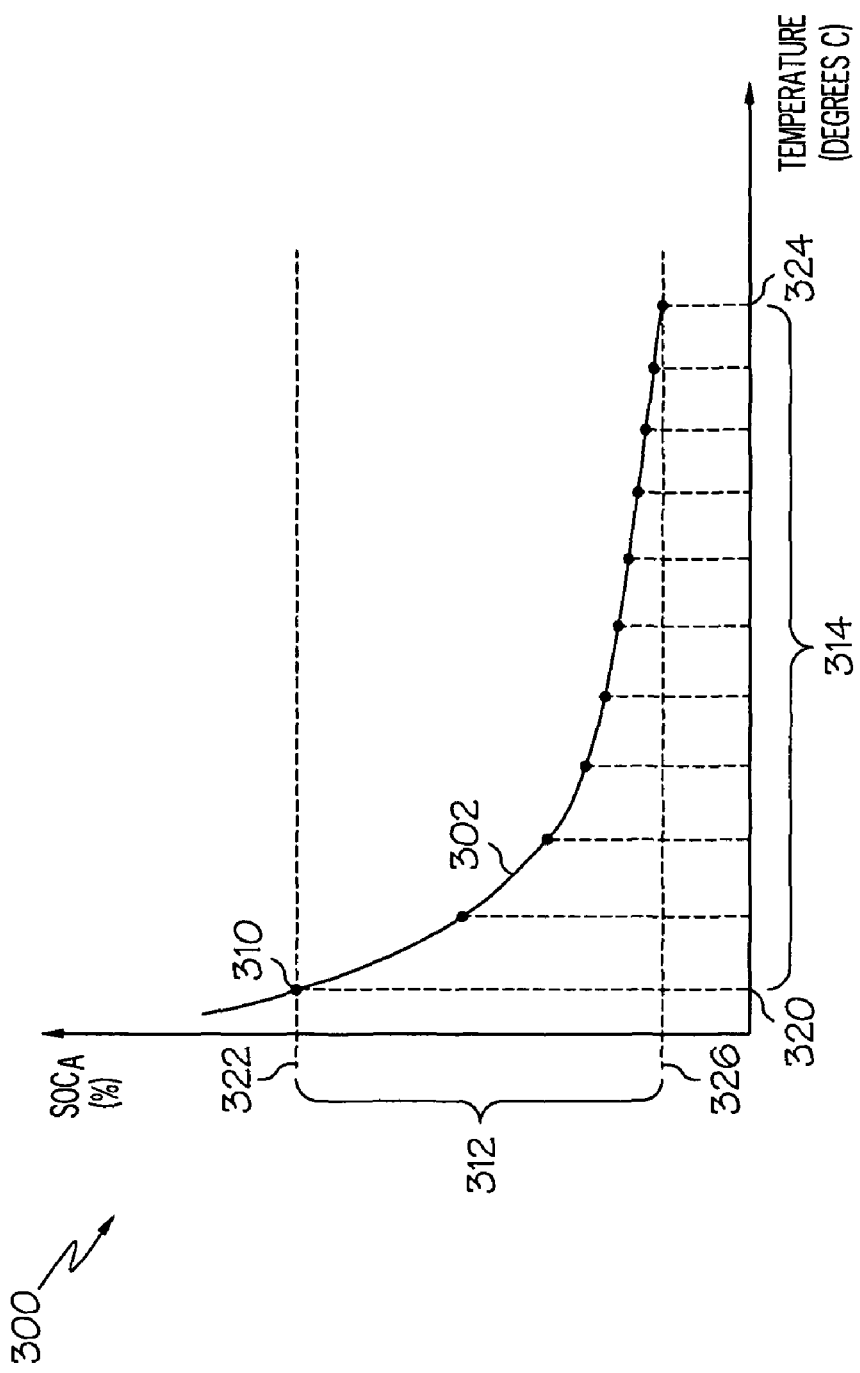
FIG. 3 is a chart illustrating a relationship between an allowable battery pack state of charge and temperature, in accordance with an example embodiment.

For example, FIG. 3 is a chart 300 illustrating a decaying, exponential relationship between battery pack temperature and allowable SOC, $SOC_A$, in accordance with an example embodiment. Curve 302 indicates a decaying exponential relationship between the battery pack temperatures and the allowable SOCs. Points 310 along curve 302 may correspond to $SOC_A$/TDV setpoint pairs that may be stored within an $SOC_A$/TDV setpoint table (e.g., Table 2, above), where those points 310 fall within a range 312 of allowable SOCs and a range 314 of temperatures. According to an embodiment, at relatively low battery pack temperatures (e.g., at temperature 320), the allowable SOCs are relatively high (e.g., SOC 322). In contrast, at relatively high battery pack temperatures (e.g., at temperature 324, the allowable SOCs are relatively low (e.g., SOC 326). Accordingly, in an embodiment, the allowable SOCs have values that are inversely related to the battery pack temperature values. Although FIG. 3 illustrates a decaying exponential relationship between allowable SOCs and battery pack temperatures, in other embodiments, the relationship may be linear, logarithmic, or may have some other mathematical relationship.

In the example embodiments above, the TDV setpoint is determined based on the battery pack temperature or the TDV setpoint is calculated from an allowable SOC. According to yet another embodiment, an allowable battery pack voltage is first determined based on the battery pack temperature, and a TDV setpoint is calculated based on the allowable battery pack voltage. This embodiment is not discussed in detail herein.

Referring again to FIG. 2, upon determining the TDV setpoint (in block 212), a determination is made whether the battery output voltage is less than the TDV setpoint, in block 214. If not, then the method iterates as shown in FIG. 2. If so, the controller controls the power output of the battery charger (e.g., battery charger 104, FIG. 1) to force current to flow into the battery (e.g., battery pack 120, FIG. 1), in block 216. For example, the controller may cause the battery charger to increase its power output in order to increase the voltage at the battery terminals (e.g., terminals 128, FIG. 1) toward the TDV setpoint. According to an embodiment, the controller provides a charger control signal (e.g., charger control signal 136, FIG. 1) to the battery charger, and the battery charger modifies its operation to attempt to produce the commanded power output at its output terminals (e.g., terminals 126, FIG. 1). The method then iterates as shown in FIG. 2 while the charging process continues.

During the charging process (e.g., during the time that the battery charger is forcing current to flow into the battery), the output voltage of the battery slowly increases. When a determination is made (e.g., in block 214) that the battery voltage has reached the TDV setpoint, the power output of the battery charger is controlled to no longer provide current to the battery. Accordingly, the charging process is effectively suspended once the battery voltage has reached the TDV setpoint, even though the charging process may not be not fully completed. This suspension of the battery charging process may continue until the temperature of the battery pack has decreased to a point that a different (e.g., higher) TDV setpoint is determined, at which time the power output of the battery charger is controlled to again force current to flow into the battery (e.g., in a subsequent iteration of block 212.

In other words, until a threshold battery pack temperature is attained, the battery charging process may continue. Upon attaining the threshold battery pack temperature, the battery pack charging process potentially may be suspended one or more times prior to the charging process being complete (e.g., prior to the charging termination criteria being satisfied). The charging process may not be resumed until the battery pack temperature has decreased to or below the threshold battery pack temperature (or another, lower threshold temperature). Accordingly, lower battery pack temperatures may be maintained throughout the battery charging process than may be maintained using conventional charging methods and apparatus. Implementations of the various embodiments may result in a longer useable life of a battery pack, when compared with the useable lives of battery packs that are recharged using conventional charging methods and apparatus.

Thus, various embodiments of methods and apparatus for battery charging have been described above. While various embodiments of systems and methods have been presented in the foregoing detailed description, it should be appreciated that a vast number of other variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing the exemplary embodiment or exemplary embodiments. It should be understood that various changes can be made in the function and arrangement of elements without departing from the scope of the inventive subject matter as set forth in the appended claims and the legal equivalents thereof.

What is claimed is:

1. A method for charging a battery of an electrical system that includes the battery, a battery charger, and a controller, the method comprising the steps of:
   determining a temperature of the battery;
      determining an allowable state of charge of the battery based on the temperature, wherein the allowable state of charge is less than a maximum state of charge of the battery; and
      determining a voltage setpoint based on the allowable state of charge; and providing a charger control signal to the battery charger to cause an inverter system of the battery charger to convert alternating current (AC) power from an AC power source into direct current (DC) power at an output power that is provided to the battery, and that results in increasing an output voltage of the battery toward the voltage setpoint.

2. The method of claim 1, wherein determining the voltage setpoint comprises:
calculating the voltage setpoint as a function of the temperature.

3. The method of claim 1, wherein determining the voltage setpoint comprises:
determining the voltage setpoint from a table of temperature/setpoint values.

4. The method of claim 1, wherein determining the voltage setpoint comprises: determining the voltage setpoint from a table of state of charge/setpoint values.

5. The method of claim 1, further comprising:
determining whether a charging termination criteria has been satisfied; and
when the charging termination criteria has been satisfied, terminating the process of charging the battery.

6. The method of claim 5, wherein the charging termination criteria is a criteria selected from a group that includes the battery having reached a maximum state of charge and a battery voltage having reached a maximum battery voltage.

7. A method for charging a battery of an electrical system that includes the battery, a battery charger, and a controller, the method comprising the steps of:
initiating a charging process to cause the battery charger to charge the battery;
determining a temperature of the battery;
determining an allowable state of charge of the battery based on the temperature, wherein the allowable state of charge is less than a maximum state of charge of the battery; and
determining a voltage setpoint based on the allowable state of charge;
providing a charger control signal to the battery charger to cause an inverter system of the battery charger to convert alternating current (AC) power from an AC power source into direct current (DC) power at an output power that is provided to the battery, and that results in increasing an output voltage of the battery toward the voltage setpoint;
when the temperature of the battery exceeds a first temperature value, temporarily suspending the battery charging process prior to satisfying a charging termination criterion;
repeating determining the temperature of the battery; and
when the temperature of the battery is less than a second temperature value, resuming the battery charging process.

8. The method of claim 7, wherein resuming the battery charging process comprises:
determining, based on the temperature, the voltage setpoint for the battery charger, wherein the voltage setpoint is less than a maximum battery voltage; and controlling the battery charger to produce the output power that results in increasing the output voltage of the battery toward the voltage setpoint.

9. An electrical system comprising:
a high voltage (HV) energy storage system having a battery pack that stores electrical energy;
a battery charger including an inverter system that converts alternating current (AC) power from an AC power source into direct current (DC) power at an output power that is provided to the battery pack, wherein the output power is produced in response to a control signal that indicates a voltage setpoint for the battery pack; and
a controller that controls a battery charging process by determining a temperature of the battery pack, determining an allowable state of charge of the battery based on the temperature, wherein the allowable state of charge is less than a maximum state of charge of the battery; and determining the voltage setpoint based on the allowable state of charge, and providing the control signal to the battery charge , and that results in increasing an out voltage of the battery pack toward the voltage setpoint.

10. The electrical system of claim 9, further comprising:
an alternating current (AC) power interface that provides a status signal to the controller, which indicates whether or not the AC power interface is electrically coupled with an external AC power source,
wherein the controller initiates the battery charging process in response to receiving the status signal.

11. The electrical system of claim 9, wherein the HV energy storage system further comprises:
one or more temperature sensors that provide temperature signals to the controller, wherein the controller uses the temperature signals to determine the temperature of the battery pack; and
a voltage sensor that provides voltage signals to the controller, which indicate a current voltage across terminals of the battery pack.

12. The electrical system of claim 9, wherein the battery pack produces a maximum output voltage across its terminals of 300 volts or more.

13. The electrical system of claim 9, wherein the battery pack produces a maximum output voltage across its terminals of 60 volts or more.

14. The electrical system of claim 9, wherein the temporarily suspends the battery charging process prior to satisfying a charging termination criteria, when the temperature of the battery pack exceeds a first temperature value, and resumes the battery charging process when the temperature of the battery pack is less than a second temperature value.

15. The electrical system of claim 9, wherein the controller temporarily suspends the battery charging process by determining, based on the temperature, the voltage setpoint to be less than a maximum battery voltage.

* * * * *